Figure 1:
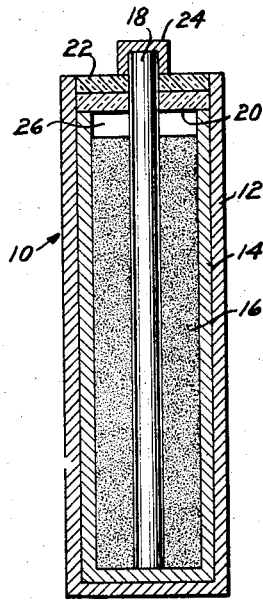

Feb. 17, 1959 G. S. LOZIER ET AL 2,874,079
PRIMARY CELLS
Filed June 13, 1956

INVENTORS
CLARENCE K. MOREHOUSE
RICHARD GLICKSMAN &
BY GERALD S. LOZIER

ATTORNEY

2,874,079
PRIMARY CELLS

Gerald S. Lozier, Princeton, Richard Glicksman, Highland Park, and Clarence K. Morehouse, Princeton, N. J., assignors to Radio Corporation of America, a corporation of Delaware Application June 13, 1956, Serial No. 591,094

13 Claims. (Cl. 136—137)

This invention relates to primary cells, and particularly, but not necessarily exclusively, to improved primary cells including an aluminum anode and a cathode comprising a positive halogen organic compound.

Primary cells are electrochemical devices from which stored chemical energy is converted directly into electrical energy by an electrochemical process. Generally, the term primary cells refers to a class of cells that do not have efficiently reversible chemical reactions. Once the chemical energy is converted to electrical energy, the cells are discarded. Primary cells that are manufactured to include a non-spillable electrolyte are referred to as dry cells. Primary cells that are assembled without one of the essential components, such as the electrolyte, but are adapted to supply electrical energy when the component is added just prior to use, are referred to as reserve cells.

A primary cell which is to be used as a portable power supply should have the following characteristics: a high watt-hour and a high ampere-hour capacity per unit of volume or weight; a high, flat operating voltage over a wide range of current drains; a long life; and a low cost.

One problem in present day primary cells is that they include materials which come into short supply in times of emergency because they become critical to the interests of the United States as a whole. These materials may become critical because they are supplied from foreign sources or because domestic ore sources are limited in size and mining capacity, or for some other economic reason.

Accordingly, an object of this invention is to provide primary cells which are comparatively inexpensive to manufacture, have a high watt-hour and a high ampere-hour capacity per unit of volume or weight, and a relatively high, flat operating voltage level over a wide range of current drains.

A further object is to provide an improved electrochemical system which may be employed in primary cells.

Another object is to provide improved primary cells including materials which are non-strategic, can be readily available in large quantities in the United States, and are comparatively inexpensive.

In general, the foregoing objects are accomplished in improved primary cells of the invention which include an anode selected from the group consisting of aluminum and aluminum-base alloys and a cathode including an organic oxidizing substance in which the oxidizing properties are due at least in part to positive halogens chemically combined in said substance. The invention includes reserve cells, including the above-described combination and adapted to be used to supply electrical energy upon the addition of an electrolyte or water.

Figure 2:
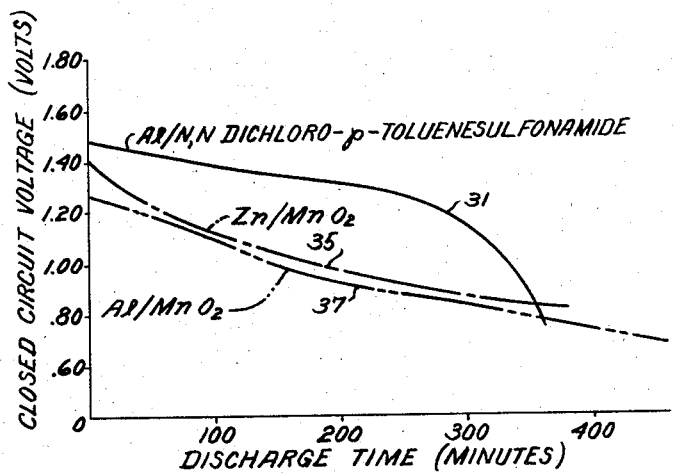
Figure 3:
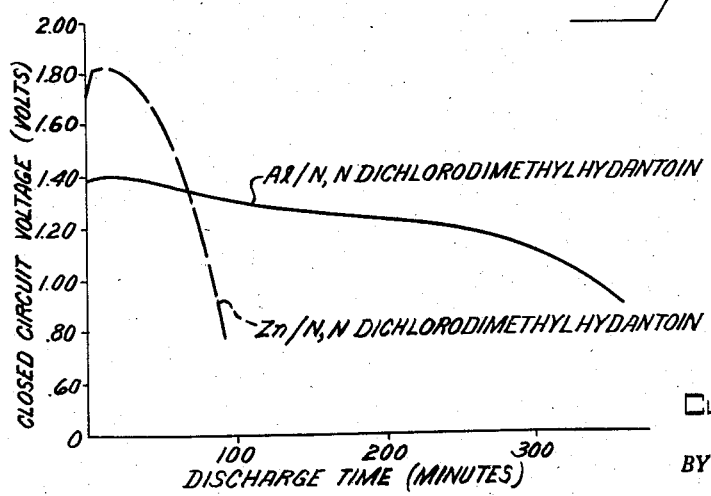

The invention is described in greater detail by reference to the drawings wherein:

Figure 1 is a sectional, elevational view of a typical dry cell of the invention, Figure 2 is a family of curves showing the change in cell voltage with respect to discharge time of a "D" size dry cell of the invention compared with comparable dry cells from other electrochemical systems when discharged continuously through a 4 ohm resistance, and Figure 3 is a family of curves illustrating the discharge characteristics of a reserve cell of the invention when discharged continuously at 0.100 ampere constant current.

*Example 1.*—Referring to Figure 1, a cell according to the invention may be prepared as follows. A metallic anode 12 is provided in the form of a cup of the standard "D" size (American Standards Association, Bureau of Standards, Washington, D. C.).

The anode 12 is a duplex product having an outer layer comprising an alloy with the composition 95.5% aluminum, 3% magnesium, 1% zinc and 0.5% manganese; and an internal layer of super-purity aluminum which comprises 70% by weight of the duplex product. This duplex alloy composition is sometimes designated Al-M-373. The anode 12 is lined with a separator 14 comprising an absorbent kraft paper. The separator 14 keeps the anode 12 and a cathode 16 apart while providing therebetween a low resistance path to the flow of ions during the electrochemical process.

A mix including the cathode material and electrolyte, hereinafter referred to as the cathode mix is prepared of the following formulation:

80 grams N, N dichloro-p-toluenesulfonamide
40 grams acetylene black
130 ml. aqueous solution containing 480 grams $AlCl_3 \cdot 6H_2O$ per liter of water Approximately 45 grams of the cathode mix is formed to a cylindrical slug and inserted into the paper lined anode 12 to form a cathode 16. A carbon rod 18 is inserted into the cathode mix 16 to provide electrical connection thereto. The anode 12 is sealed with an insulating washer 20 mounted on the carbon rod and a layer 22 of hard wax on the washer 20. A metal contact cap 24 of brass is placed on rod 18. An air space 26 is provided between the washer 20 and the cathode 16.

The anode and cathode may now be connected through an external load whereby the cell commences to be discharged by electrochemical action. The cell reactions are believed to occur as follows:

A. CATHODE REACTION

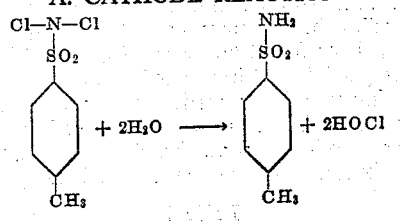

$2HOCl + 4e^- \longrightarrow 2Cl^- + 2OH^-$

B. ANODE REACTION

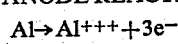

C. OVERALL CELL REACTION

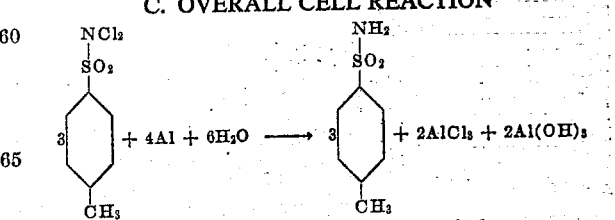

Figure 2 shows characteristic initial discharge curves for "D" size dry cells discharged continuously through a 4 ohm load resistance (simulating the current drain requirements in a flashlight). Curve 31 shows a characteristic discharge curve for a cell prepared according to Example 1 containing N,N dichloro-p-toluenesulfonamide as the cathode material and an aluminum anode (aluminum/N,N dichloro-p-toluenesulfonamide). For comparison, curve 35 shows the characteristic discharge curve for a similar commercially-available zinc/manganese dioxide cell discharged under the same conditions, and curve 37 shows the characteristic discharge curve data for a similar aluminum/manganese dioxide cell wherein the cathode mix formulation is:

225 grams manganese dioxide
25 grams acetylene black
30 grams $AlCl_3 \cdot 6H_2O$
20 grams $(NH_4)_2CrO_4$
10 grams $CrCl_3 \cdot 6H_2O$
67 ml. water The dry cell of Example 1 operates at a considerably higher voltage than the comparable zinc/manganese dioxide and aluminum/manganese dioxide dry cells. It should also be noted that the cell of Example 1 has a desirable high flat voltage curve.

In addition to its favorable performance, the cell of Example 1 has the great advantage that it employs non-strategic, plentiful materials which are relatively easy to manufacture in the United States, and when manufactured in large quantities, should be relatively inexpensive. Aluminum may be obtained from clay and the N,N dichloro-p-toluenesulfonamide may be produced synthetically.

The primary cells of the invention comprise generally the following parts:

(1) An anode selected from the group of materials consisting of aluminum and aluminum-base alloys, (2) An electrolyte which may include (a) a soluble substance for increasing the electrical-conductivity thereof and (b) a material for inhibiting the corrosion of the anode, (3) A cathode including a depolarizer consisting of an organic oxidizing substance in which the oxidizing properties thereof are due at least in part to chemically combined positive halogens. The cathode may include also an inorganic depolarizer, other organic depolarizer and/or an inorganic material for increasing the conductivity of the cathode.

*The anode.*—The anode for the primary cells of the invention may be aluminum or aluminum-base alloys. The term "aluminum anode" includes both aluminum and aluminum-base alloy anodes. An aluminum-base alloy is one wherein the predominant ingredient is aluminum. Thus, any alloy having more than 50% aluminum is satisfactory. It is preferred however, to have as high a proportion as possible. Other ingredients are added to aluminum to improve the properties of the anode for fabrication purposes, to impart a greater degree of corrosion resistance or for other reasons. Table I sets forth examples of some suitable aluminum anode materials.

*Table I*

| Alloy and Temper | Composition |
| --- | --- |
| 2S-O | "Commercially pure" aluminum. |
| 2S-H | Do. |
| 3S-O | Al+1.2% Mn. |
| 3S-H | Al+1.2% Mn. |
| 17S-T | Al+4.0% Cu+0.5% Mn+0.5% Mg. |
| 24S-T | Al+4.5% Cu+0.6% Mn+1.5% Mg. |
| 52S-O | Al+2.5% Mg+0.25% Cr. |
| 52S-H | Al+2.5% Mg+0.25% Cr. |
| 53S-W | Al+0.7% Si+1.3% Mg+0.25% Cr. |
| 53S-T | Al+0.7% Si+1.3% Mg+0.25% Cr. |
| 61S-W | Al+0.25% Cu+0.6% Si+1.0% Mg+0.25% Cr. |
| 61S-T | Al+0.25% Cu+0.6% Si+1.0% Mg+0.25% Cr. |
| 56S | Al+5.25% Mg+0.1% Mn+0.1% Cr. |
| Alclad 3S-O | A duplex product made of a 3S core with a coating of 72S (Al+1% Zn) on one or both sides. |
| Alclad 3S-H | A duplex product made of a 3S core with a coating of 72S (Al+1% Zn) on one or both sides. |
| Alclad 17S-T | A duplex product made of a 17S-T core and coatings of aluminum on one or both sides. |
| Alclad 24S-T | A duplex product made of a 24S-T core and coatings of aluminum on one or both sides. |

The aluminum anode may be the container for the cell, may be the lining of the container, or may be a separate structure inserted in the container. The aluminum anode may be in any geometrical configuration desired. In Example 1, a paper separator lined the aluminum anode cup 12. It is necessary to space the cathode from the anode. To accomplish this, it is preferred to insert a separator between the anode and cathode regardless of configuration, although other methods may be used. The separator may be any porous material; kraft paper, porous ceramics, or other inorganic or organic structures.

*The electrolyte.*—The electrolyte may be water containing a soluble salt such as sea water or water to which one or more soluble salts have been deliberately added. Bromids and chlorides of alkali metals, alkaline earth metals, aluminum, chromic, manganous, and ferric cations are suitable soluble salts in the electrolyte. The electrolyte may be prepared by dissolving the hydrated salt in water in a concentration between about 30 grams per liter and that which produces a saturated solution at ordinary temperatures. The concentration does not appear to be critical although for best results certain concentrations are preferred depending upon the particular salt or combination of salts that are used. For example, preferred concentrations of the hydrated aluminum metal chloride are from about 150-600 grams, preferably 480 grams of hydrated salt per liter of water. While a single salt may be used as the electrolyte, combinations of salts, particularly combinations of aluminum chloride and chromic chloride are desirable. Examples of soluble salts that may be added to the electrolyte are zinc chloride, manganous chloride, magnesium bromide, magnesium chloride, aluminum chloride, ammonium chloride, chromic chloride, alkali metal chlorides, potassium chloride and calcium chloride.

It is also desirable to include in the electrolyte one or more alkali metal, alkaline earth metal (including aluminum) or ammonium salts of chromic acid in corrosion-inhibiting amounts. The chromic acid salts may be used in proportions between 0.01 gram per liter of solution to concentrations producing saturation in the presence of the electrolyte salt contained therein. It is preferred to use a proportion equal to that of the electrolyte salt for dry cells. Examples of corrosion-inhibiting salts are sodium chromate, aluminum chromate, potassium dichromate, lithium dichromate, magnesium chromate, calcium chromate, ammonium chromate, and ammonium dichromate.

For certain applications, principally where a long shelf life is desired, it is desirable to omit one of the compounds of the primary cell until the need for electrical energy has arisen. The primary cells of the invention are particularly adaptable to be prepared as reserve cells. In reserve cells, materials corrosive to the anode such as aqueous solutions of aluminum chloride, chromic acid and phosphoric acid, may be used to enhance the voltage of the cell.

*The cathode.*—The cathode includes an organic oxidizing substance in which the oxidizing properties are due at least in part to positive halogens combined in said substance. The halogens include chlorine, bromine and iodine. These substances are also referred to as positive halogen organic compounds. During the electrochemical action, the substance undergoes a reduction as the primary cell furnishes electric current.

An organic oxidizing substance containing positive halogens, when treated with water yields hypohalous acid, a powerful oxidizing agent, of the form HOX, where X designates any one of the halogen group: chlorine, bromine and iodine. Thus a test for a positive halogen comprises reacting the material in question with an aqueous solution of an iodine compound which is oxidized by the hypohalous acid liberated by the reaction of the substance with water, liberating iodine. For example, the following equations illustrate the release of iodine by a reaction between water, N,N dichloromethylamine, and hydrogen iodide:

$$(CH_3)_2NCl_2 + 2HOH \rightarrow (CH_3)_2NH_2 + 2HOCl$$
$$2HOCl + 4HI \rightarrow 2I_2 + 2HCl + 2HOH$$

Some of the positive halogen organic compounds are relatively insoluble in conventional electrolytes and are particularly suitable as cathode materials in dry cells. Some of the insoluble positive halogen organic compounds are also liquids which are immiscible with the electrolyte and can be adsorbed by a material such as acetylene black or graphite. Some of the positive halogen organic compounds may be soluble in the cell electrolyte. These substances may be used in reserve cells.

The following list includes some of the positive halogen organic compounds which are useful in preparing primary cells according to the invention. The members of the list are intended as examples only. In the list, X is meant to refer to a halogen atom, such as chlorine, bromine or iodine.

A. Amines of the general formula $RNHX$, $RNX_2$, $R_2NX$ where R is an alkyl radical. A typical example of this class is: N,N dichloromethylamine
B. Amides
   1. Carboxylic Acid Amides
      Aliphatic monocarboxylic acid amides:
         N-chloroacetamide
         N-bromoacetamide
      Aliphatic dicarboxylic acid amides:
         N,N′ dibromosuccinamide
         N,N′ dibromooxamide
         N,N′ dibromoadipamide
      Aromatic monocarboxylic acid amide:
         N-bromobenzamide
      Aromatic dicarboxyl acid amides:
         N,N′ dibromoterephthalamide
   2. Sulfonic Acid Amides of the Formula $RSOONHX$ and $RSOONX_2$
      Sodium salt of N-chlorobenzenesulfonamide
      Sodium salt of N-chloro-p-toluenesulfonamide
      N,N-dichloro-p-toluene sulfonamide and N,N dibromo-p-toluenesulfonamide
      N,N-dichloro-benzene sulfonamide and N,N dibromo-p-benzenesulfonamide
      N,N-dichloro-p-carboxylic acid-benzene sulfonamide
   3. Derivates of Carbonic Acid Amides
      N,N′ dichloro or dibromobuiret
C. Imides Derived from Dibasic Acids
   N-chlorosuccinimide
   N-bromosuccinimide
   N-bromophthalimide
   Ethyl-N-bromophthalimide
D. Quinone Imides
   N,2,6 trichloro-p-quinoneimine
   N-chloro-p-quinoneimine
E. Cyclic Ureides
   N-monochloro and monobromo dimethylhydantoin
   N,N′ dichloro and dibromo dimethylhydantoin
   N,N′ dibromobarbituric acid
   N,N′ dichloro and dibromodiphenylhydantoin
F. Amidines of Carbonic Acid
   Trichloromelamine and tribromomelamine
   Hexachlormelamine
   Penta and tetra chloromelamines—these are mixtures of trichloro and hexachlormelamines
   N,N′ dichloroazodicarbonamidine
   Trichloroisocyanuric acid
   N-chloroacetoguanamine
   N-chloropropiguanamine
   N-chlorodicyandiamide
G. Pyrrolidones
   Polyvinyl pyrrolidone with 10% iodine Any positive halogen organic compound may be used as cathodes of the primary cells of the invention. The primary cells of the invention all utilize the electron change obtained in converting a positive halogen ion to a negative halogen ion. This is shown schematically by the following equation where X is a halogen:

$$X^+ + 2e^- \rightarrow X^-$$

In addition, such compounds may have other radicals in their structure which alter their physical and chemical properties to affect the stability and solubility in the electrolyte. It is also recognized that by changing the structure of the positive halogen organic compounds, the theoretical capacity, shelf life and the rate at which electrical energy can be withdrawn from the cell can be altered. The selection of the particular compound and its structure will depend on the application for which the particular primary cell is intended. The utility of the positive halogen organic compound may be further enhanced by the presence of oxidizing groups such as nitro, azo, etc. groups which will increase the theoretical capacity. The cathodes of the primary cells of the invention may also comprise a mixture of one or more positive halogen organic compounds, or a mixture with one or more other organic oxidizing compounds, such as quinone, or certain organic azo compounds, or with inorganic cathode materials such as manganese dioxide or the like.

For many situations, it is desirable to increase the electrical conductivity of the cathode. One may add varying proportions of non-reactive conductive materials to obtain the desired electrical conductivity. Carbon is a preferred material for this purpose because of its low cost and easy availability. Any of the various forms of carbon, such as graphite, or acetylene black may be used. The conducting material may comprise up to 80% by weight of the cathode mix.

The cathodes of the invention may be fabricated by a number of methods and in various shapes. Example 1 describes preparing a mixture of powders with electrolyte and then pressing a quantity of the mixture to the desired shape and density. Another cathode mix may include a binder such as polyvinyl alcohol, carboxymethylcellulose, methylcellulose, a vinyl resin, bentonite or silica gel. Such mix may be pressed as described above, or cast in a mold to fabricate the cathode. The binder adds strength and rigidity to the cathode especially where odd shapes are used. A cathode mix containing a binder may be coated on a suitable support such as a carbon rod or black and used in layer form. Besides simple coatings, films containing the cathode mix may also be prepared by the addition of a film-forming material to the cathode mix and using techniques well-known in the plastics art. One technique is to coat paper separator sheets with aluminum powder in a binder on one surface and the cathode mix in a binder on the other surface. The coated sheets may then be stacked and stamped to produce batteries of the desired voltage and geometry.

Many of the positive halogen organic compounds used in the cathodes of the invention melt at relatively low temperatures without decomposition. N,N′ dichlorodimethylhydantoin, for example, melts at 130° C. The cathode mix may be prepared by mixing the dry powders, fusing and then pulverizing the fused product. The pulverized product may then be fabricated into cathodes by one of the methods described above. By another method and upon fusion, the cathode mix may be cast directly to the desired shape either in a mold or directly in the place where it is to be used.

In some cases, it is desirable to increase the amount of active surface on the cathode. One method for increasing the active surface is to add a proportion of a soluble material, such as sodium chloride, to the cathode mix before fabrication. Upon fabrication, the soluble material is dissolved out of the cathode leaving a somewhat porous structure with a greatly increased proportion of active surface.

The presence of atmospheric oxygen enhances the capacity of the cathode of cells of various kinds. For example, capacity increases can be realized in the cells of Figure 1 by providing a small vent (e. g., 0.05 inch in diameter) in the wax layer 22 by preparing a tab on the washer 20 which tab 20 extends up through the wax seal 22. The maximum effect is ordinarily obtained when the current drain is relatively light.

It is noteworthy that the materials used to fabricate the cells of the invention may all be produced in the United States by processes well known in the chemical arts. The positive halogen organic compounds may be produced synthetically and many such substances such as N,N' dichlorodimethylhydantoin, are commercially available at the present time. Graphite and acetylene black are also available from sources within the United States.

*Example 2.*—A reserve cell may be prepared as follows. Prepare a cathode mix of the following ingredients:

20 grams N,N' dichlorodimethylhydantoin
10 grams graphite

Heat this mixture until it is molten (about 140° C.), pour the molten mass into a paper lined can (I. D. 0.395"—height 1.824"), insert a carbon rod, and then allow the mass to solidify. Upon cooling remove the solid mass from the can, wrap with a piece of absorbent non-woven fabric material. Then place a piece of 0.012" thick aluminum sheet (super purity) around the assembly and bind with a wire. The assembly has the following approximate size: height, 1.25"; diameter, 0.50"; volume, 0.25 cu. in.; and the following weights: carbon rod, 1.3 g.; cathode material, 0.7 g.; cell (dry) 4.0 g.; cell (wet) 5.0 g. This cell may be stored for a period of time and when desired for use, is immersed in an aqueous solution containing 480 grams of $AlCl_3 \cdot 6H_2O$ per liter of water.

*Example 3.*—A flat reserve cell which operates at very high discharge rates may be prepared by first mixing the following ingredients to prepare a cathode mix:

100 grams N,N' dichlorodimethylhydantoin
50 grams acetylene black
26 ml. solution containing 3% animal glue dissolved in acetone Paste a quantity of the cathode mix to a graphite plate about 2.75" x 1.1875" x 0.50" thick. The cathode is wrapped with a piece of salt-free kraft paper and then wrapped with a sheet. The assembly was then immersed in an aqueous solution containing 480 grams $AlCl_3 \cdot 6H_2O$ per liter of water. Figure 3 shows characteristic discharge curves of this cell compared with similar size zinc/N,N' dichlorodimethylhydantoin cells under a constant current drain of 0.100 ampere.

*Example 4.*—Another dry cell of the invention may be prepared according to Example 1 except that the cathode mix comprises the following formulation:

80 grams trichloromelamine
40 grams acetylene black
30 grams ammonium chromate
100 ml. aqueous solution containing 480 grams $AlCl_3 \cdot 6H_2O$ per liter of water

*Example 5.*—Another dry cell of the invention may be prepared according to Example 1 except that the cathode mix comprises the following formulation:

80 grams hexachloromelamine
40 grams acetylene black
30 grams ammonium chromate
100 ml. aqueous solution containing 480 grams $AlCl_3 \cdot 6H_2O$ per liter of water

*Example 6.*—Another dry cell of the invention may be prepared according to Example 1 except that the cathode mix comprises the following formulation:

80 grams N,N' dichloroazodicarbonamidine
40 grams acetylene black
130 ml. aqueous solution containing 400 grams $MnCl_2 \cdot 4H_2O$ and 5 grams $Na_2Cr_2O_7$ per liter of water

*Example 7.*—Another dry cell of the invention may be prepared according to Example 1 except that the cathode mix comprises the following formulation:

80 grams trichloromelamine
80 grams p-toluquinone
80 grams acetylene black
30 grams ammonium dichromate
260 ml. aqueous solution containing 480 grams $AlCl_3 \cdot 6H_2O$ per liter of water

*Example 8.*—Another dry cell of the invention may be prepared according to Example 1 except that the cathode mix comprises the following formulation:

240 grams hexachloromelamine
240 grams manganese dioxide
180 grams acetylene black
80 grams sodium dichromate
670 ml. aqueous solution containing 480 grams $AlCl_3 \cdot 6H_2O$ per liter of water There have ben described improved primary cells which are inexpensive to manufacture and exhibit a high watt-hour and ampere-hour capacity per unit or value of watt and a high flat operating voltage level over a wire range of current drains. The cells of the invention use materials which may be produced within the United States in large quantities by techniques well known in the chemical art.

What is claimed is:

1. In a primary cell utilizing the electron change obtained in converting a positive halogen ion to a negative halogen ion, an anode selected from the group consisting of aluminum and aluminum base alloys in combination with a cathode including a depolarizer consisting of an organic oxidizing compound in which the oxidizing properties of said substance are due at least in part to positive halogens chemically combined in said compound, said compound being selected from the group consisting of amines of the general formula $RNHX$, $RNX_2$, $R_2NX$ where R is an alkyl radical and X is a halogen atom, imides derived from dibasic acids, cyclic ureides, carboxylic acid amides, sulfonic acid amides, derivatives of carbonic acid amides, and amidines of carbonic acid.

2. A primary cell according to claim 1 wherein said anode comprises an aluminum base alloy.

3. A primary cell according to claim 1 wherein said cathode comprises a mixture of different organic oxidizing compounds in which the oxidizing properties of at least one of said compounds are due at least in part to positive halogens chemically combined in said substances.

4. A primary cell according to claim 1 wherein said cathode includes an inorganic depolarizer.

5. A primary cell according to claim 1 wherein said cathode includes an inorganic material for increasing the electrical conductivity of said cathode.

6. A primary cell utilizing the electron change obtained in converting a positive halogen ion to a negative halogen ion comprising an aluminum anode, an electrolyte, and a cathode including a depolarizer consisting of an organic oxiding compound in which the oxidizing properties are due at least in part to positive halogens chemically combined in said compound, said compound being selected from the group consisting of amines of the general formula $RNHX$, $RNX_2$, $R_2NX$ where R is an alkyl radical and X is a halogen atom, imides derived from dibasic acids, cyclic ureides, carboxylic acid amides, sulfonic acid amides, derivatives of carbonic acid amides, and amidines of carbonic acid.

7. A primary cell according to claim 6 wherein said electrolyte is an aqueous solution having dissolved therein a compound selected from the group consisting of aluminum chloride, manganese chloride, chromium chloride, ammonium chloride, zinc chloride, alkali metal chlorides and alkaline earth metal chlorides.

8. A primary cell according to claim 6 wherein said electrolyte is an aqueous solution having dissolved therein a chromic acid salt of an anion selected from the group consisting of alkali bases, alkaline earth metal bases and ammonium bases.

9. A primary cell utilizing the electron change obtained in converting a positive halogen ion to a negative halogen ion comprising an aluminum-base alloy anode, an aqueous electrolyte having dissolved therein aluminum chloride and a chromate inhibitor, and a cathode comprising carbon and an organic oxidizing compound in which the oxidizing properties are due at least in part to positive halogens chemically combined in said compound, said compound being selected from the group consisting of amines of the general formula $RNHX$, $RNX_2$, $R_2NX$ where R is an alkyl radical and X is a halogen atom, imides derived from dibasic acids, cyclic ureides, carboxylic acid amides, sulfonic acid amides, derivatives of carbonic acid amides, and amidines of carbonic acid.

10. A primary cell including an aluminum anode, an aqueous electrolyte and a cathode including N,N' dichlorodimethylhydantoin.

11. A primary cell including an aluminum anode, an aqueous electrolyte and a cathode including N,N dichloro-p-toluenesulfonamide.

12. A primary cell including an aluminum anode, an aqueous electrolyte and a cathode including hexachloromelamine.

13. A primary cell including an aluminum anode, an aqueous electrolyte and a cathode including N,N' dichloroazodicarbonamidine.

References Cited in the file of this patent

UNITED STATES PATENTS

| | | |
|---|---|---|
| 2,306,927 | Arsem | Dec. 29, 1942 |
| 2,343,194 | Lawson | Feb. 29, 1944 |
| 2,554,447 | Sargent | May 22, 1951 |
| 2,612,533 | Blake | Sept. 30, 1952 |